(12) United States Patent
Reed

(10) Patent No.: US 9,857,780 B1
(45) Date of Patent: Jan. 2, 2018

(54) POSITIONING WORK STOP

(71) Applicant: Daniel Reed, Pleasant Plain, OH (US)

(72) Inventor: Daniel Reed, Pleasant Plain, OH (US)

( * ) Notice: Subject to any disclaimer, the term of this patent is extended or adjusted under 35 U.S.C. 154(b) by 1057 days.

(21) Appl. No.: 13/837,046

(22) Filed: Mar. 15, 2013

(51) Int. Cl.
*G06F 19/00* (2011.01)
*G05B 15/02* (2006.01)

(52) U.S. Cl.
CPC ..................... *G05B 15/02* (2013.01)

(58) Field of Classification Search
CPC ............................. G01B 3/004; G06Q 50/06
USPC ...................... 700/57–60, 114–192
See application file for complete search history.

(56) References Cited

U.S. PATENT DOCUMENTS

| | | | |
|---|---|---|---|
| 3,400,676 A * | 9/1968 | Raudonis, Jr. ........... | D05B 9/28 112/276 |
| 3,613,981 A | 10/1971 | Ramseier | |
| 3,730,296 A | 5/1973 | Huigens | |
| 3,849,669 A | 11/1974 | Weston | |
| 3,958,479 A | 5/1976 | Leibinger | |
| 4,023,084 A | 5/1977 | Owa | |
| 4,246,577 A | 1/1981 | Shima et al. | |
| 4,405,421 A | 9/1983 | Inoue | |
| 4,557,371 A * | 12/1985 | Yonezawa ............. | B23Q 3/061 294/87.1 |
| 4,678,976 A | 7/1987 | Inoue | |
| 5,730,643 A * | 3/1998 | Bartlett ................. | B23Q 11/08 451/11 |
| 5,847,529 A * | 12/1998 | Chao ....................... | B25J 19/06 318/563 |
| 5,860,900 A | 1/1999 | Dunning et al. | |
| 5,895,184 A | 4/1999 | Walters et al. | |
| 6,140,931 A | 10/2000 | Yamane et al. | |
| 6,257,045 B1 * | 7/2001 | Hosokawa ........... | G05B 19/401 73/1.79 |
| 6,543,973 B2 | 4/2003 | Lapikas et al. | |
| 7,013,775 B1 | 3/2006 | Song et al. | |
| 7,104,866 B2 | 9/2006 | Yamane et al. | |
| 7,173,691 B2 | 2/2007 | Murphy et al. | |
| 7,351,019 B2 | 4/2008 | Bosker et al. | |
| 8,207,697 B1 | 6/2012 | Reed | |
| 2002/0170885 A1 * | 11/2002 | Krenz ..................... | B23H 1/00 219/69.11 |

(Continued)

FOREIGN PATENT DOCUMENTS

CH        EP 1248076 A1 * 10/2002 ............. G01B 7/003

OTHER PUBLICATIONS

Machine translation of EP1248076 from http://www.google.com/patents retrieved on Jan. 20, 2016.*

*Primary Examiner* — Michael D Masinick
(74) *Attorney, Agent, or Firm* — Mark F. Smith; Smith Brandenburg Ltd

(57) ABSTRACT

The present invention is a positioning work stop for use with a machine tool for and having a signaling means that operates as a placement indicator effective for providing a signal if the work piece to be machined is in its proper position for machining or for signaling if the work piece has shifted out of position for machining. In a preferred embodiment of the invention the positioning work stop comprises a stop member having a stop surface, a switch element, a signaling means, and a power supply that are electrically coupled such that the signaling means activates when the work piece is in its proper position for manufacturing and for signaling if the work piece has shifted out of position for machining.

16 Claims, 5 Drawing Sheets

(56) References Cited

U.S. PATENT DOCUMENTS

| | | | |
|---|---|---|---|
| 2010/0025383 A1* | 2/2010 | Tiberghien | B23K 11/115 219/119 |
| 2010/0201483 A1* | 8/2010 | Nakajima | B60R 25/245 340/5.61 |
| 2013/0147437 A1* | 6/2013 | Yamada | H02J 7/0068 320/128 |

* cited by examiner

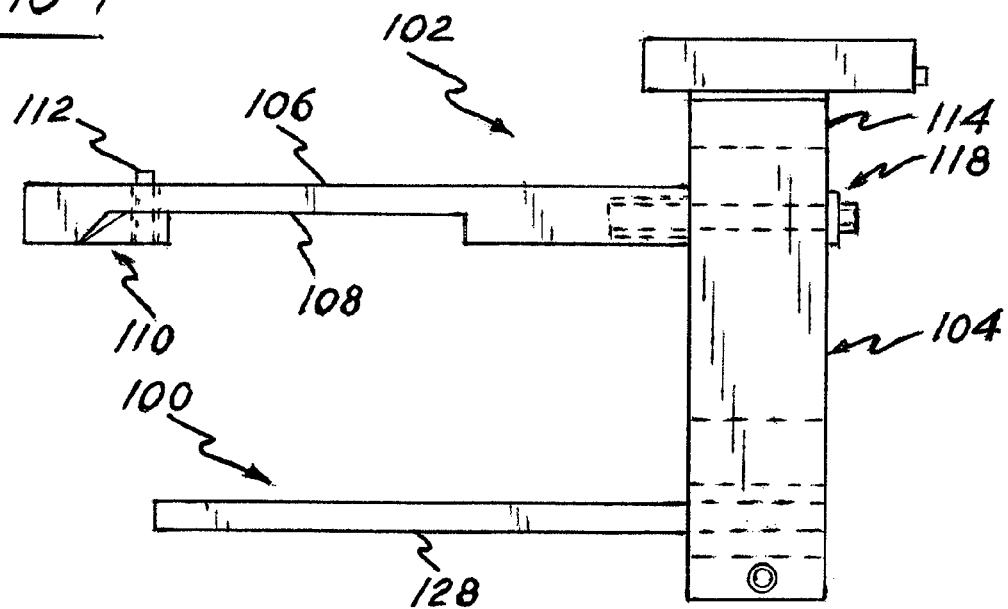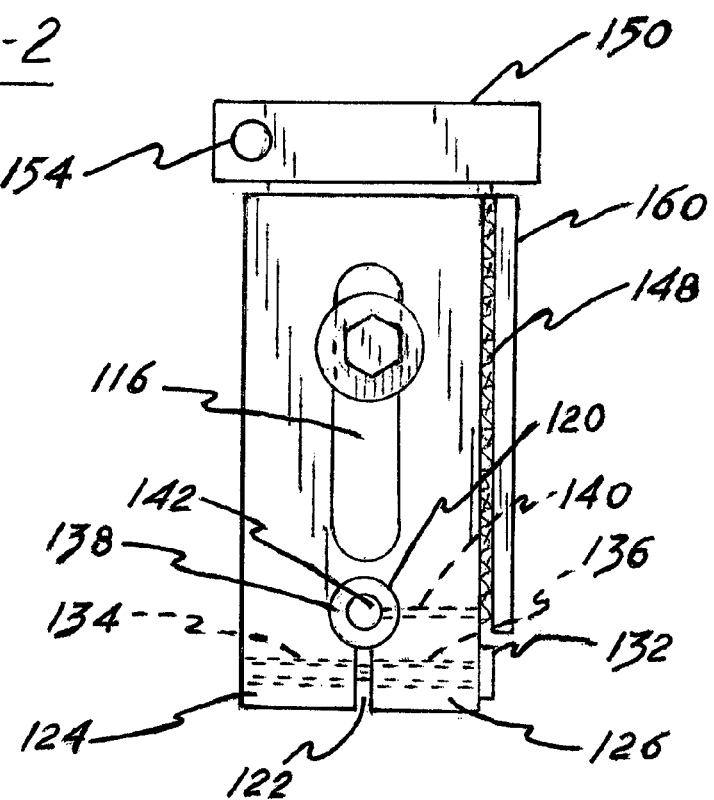

POSITIONING WORK STOP

BACKGROUND OF THE INVENTION

The present invention is directed to a positioning work stop and more particularly to a positioning work stop for use with a machine tool in performing a precision machining operation and which informs the operator that the work piece is in its proper position for machining.

Computerized numerical controls (CNC) and other well-known machine tools are used to perform various machining operations. Before a machining operation can be performed, the work piece to be machined must be properly placed and held in a mounting fixture for positioning the work piece at a desired location relative to the machining tool. This is particularly important when the machining process is being performed on a CNC machine where the position of the work piece must align with the zero reference point programmed into the computer controls. A number of conventional positioning stops have been developed to accomplish the task of ensuring that the work piece is properly positioned.

Most such positioning work stops are relatively simple, manually operated devices whereby the machine operator installs the stop at a desired location and orientation, and sets the stop mechanism. When the work piece is placed in the mounting fixture and the surface makes contact with the stop, the machine operator knows that the work piece is in its proper position for machining. Unfortunately, work pieces often are jarred during setup or processing and slightly shift position and may no longer be in its proper position for machining. This is particularly problem some when machining highly precision parts. Further, when the work piece shifts out of position, the machining apparatus continues to operate that often results in a work piece being cut or machined out of specification thereby resulting in the work piece being scrapped or reworked. Further, this requires each work piece to be carefully inspected after the machining operation thereby significantly increasing the manufacturing time and cost of operation.

Accordingly, there is a need for a positioning work stop that can be used with conventional machining apparatus and operates to inform the machine operator that the work piece is in its proper position for machining and inform the machine operator if the work piece shifts out of its proper position and is no longer in its proper position on the positioning fixture. Further, a need exists for a positioning work stop that cooperates with the machine tool control system of the machining apparatus that stops the machining operation until the work piece is placed back into its proper position for machining or provide information necessary for the machine tool control system to adjust the machining operation to correct for the movement of the work piece.

SUMMARY OF THE INVENTION

The present invention is a positioning system for a work piece comprising a positioning work stop for use with a machine tool and having a signaling means that operates as a placement indicator effective for providing a signal if the work piece to be machined is in its proper position for machining and for signaling if the work piece has shifted or moved out of position for machining prior to or during the machining operation. Further, the positioning work stop communicates with a positioning control system that cooperates with a machine tool control system that operates to stop the machining process on the work piece upon receiving the signal that the work piece has shifted or moved out of its proper position for machining.

In a preferred embodiment of the invention the positioning work stop includes a stop member is a position transducer that operates to determine the amount of movement of the work piece after initial proper placement of the work piece.

In a preferred embodiment of the invention the positioning work stop is in communication with a positioning control system that operates to receive a signal from the positioning work stop and communicates with and cooperates with the machine tool control system to adjust the manufacturing process to compensate for movement of the work piece.

In a preferred embodiment of the invention the positioning work stop operates to determine if the work piece moves out of position during the manufacturing process and the amount of the movement of the work piece.

A preferred embodiment of the invention is a positioning work stop for use with a machine tool and comprises a signaling means for providing a signal when the work piece is in its proper position for receiving a machining operation and operates to prevent the start of the machining operation until the work piece is in its proper position.

In a preferred embodiment of the invention the signaling means comprises a light source for providing a visual signal.

In another preferred embodiment of the invention the signaling means comprises an audio source for providing an audio signal.

In a preferred embodiment of the invention the signaling means comprises an electrical signal that communicates with the positioning control system that records information concerning the manufacturing process performed on the work piece.

In a preferred embodiment of the invention the information includes the identification of the particular work piece, the time the work piece moved out of position during the manufacturing process, and the manufacturing process being performed on the work piece.

In another preferred embodiment of the invention the positioning work stop includes a stop member removably attached to a positioning fixture.

In another preferred embodiment of the invention, the work stop comprises a stop member having a stop surface extending outwardly therefrom, a switch element, and a signaling means, wherein the signaling means activates when the work piece makes contact with the stop surface.

In another preferred embodiment of the invention the signaling means comprises a light source for providing a visual signal.

In another preferred embodiment of the invention the signaling means comprises an audio source for providing an audio signal.

In another preferred embodiment of the invention the switch element comprises a stop member extending outwardly from a housing and an electric connector means mechanically connected to the stop member and electrically connected to the signaling means such that in operation when the work piece is in contact with the stop member the signaling means provides a visual or an audio signal.

In another preferred embodiment of the invention the housing is electrically connected to the signaling means and wherein the electric connector means comprises a flexible cantilever having an electrically un-insulated end that is adapted to be urged against the housing when the work piece makes contact with the stop surface and activate the signaling means.

In another preferred embodiment of the invention the positioning work stop further comprises a power source for providing electric power to the signaling means.

In another preferred embodiment of the invention the stop member comprises a transmitter for transmitting a signal to indicate that the work piece is in its proper position for machining.

In another preferred embodiment of the invention the power source is a rechargeable power source.

A preferred embodiment of the invention is a positioning work stop for use with a machine tool having a machine tool control system for controlling the manufacturing process being performed on a work piece, the positioning work stop comprises a stop member for ensuring that the work piece is in proper position for the machining process; a signaling means in electrical communication with the stop member; a positioning control system in communication with the signaling means and the machine tool control system; wherein the stop member operates to determine if the work piece is in position for the manufacturing process or has moved out of position for the manufacturing process; wherein the signaling means operates to provide a signal when the work piece is in the proper position for the manufacturing process and for providing a signal when the work piece is no longer in the proper position for the manufacturing process; and wherein the positioning control system operates to allow the manufacturing apparatus to begin the manufacturing process if the work piece is in the proper position for the manufacturing process and to stop the manufacturing process if the work piece is no longer in the proper position.

Other aspects, advantages, and embodiments of the invention will be apparent from the following description, the accompanying drawings and the appended claims.

BRIEF DESCRIPTION OF THE DRAWINGS

These and other features, aspects, and advantages of the present invention will become better understood with regard to the following description, appended claims, and accompanying drawings where:

FIG. 1 is a top plan view of a preferred embodiment of a positioning work stop having a positioning fixture;

FIG. 2 is a side view of the positioning fixture of FIG. 1;

DETAILED DESCRIPTION OF THE INVENTION

The present invention is a positioning work stop for use with a machine tool which is effective for providing a signal to indicate if the work piece to be machined is in its proper position for machining or to indicate if the work piece has shifted or moved out of position for machining. Further, the positioning work stop includes a positioning control system that communicates with the machine tool control system of the machining apparatus that operates to prevent the machining operation to start until the work piece is in its proper position and to stop the machining operation if the work piece shifts or moves out of position. In a preferred embodiment, the positioning work stop operates to measure the amount of the shift or movement of the work piece and communicates with the positioning control system and/or the machine tool control system that operates to adjust the machining operation to compensate for the shift or movement of the work piece and/or determine if the shift or movement is within a predetermined tolerance to permit the machining operation to proceed. Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 3:
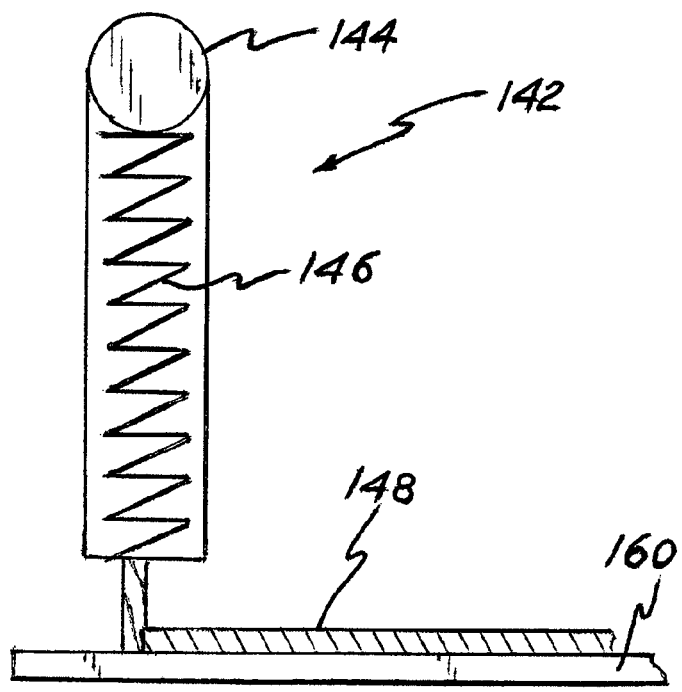
FIG. 3 is a schematic illustration of a switch element effective for electrically coupling the stop member to the power supply for energizing the signaling means to provide a signal indicating that the work piece is in position for machining.
Figure 4:
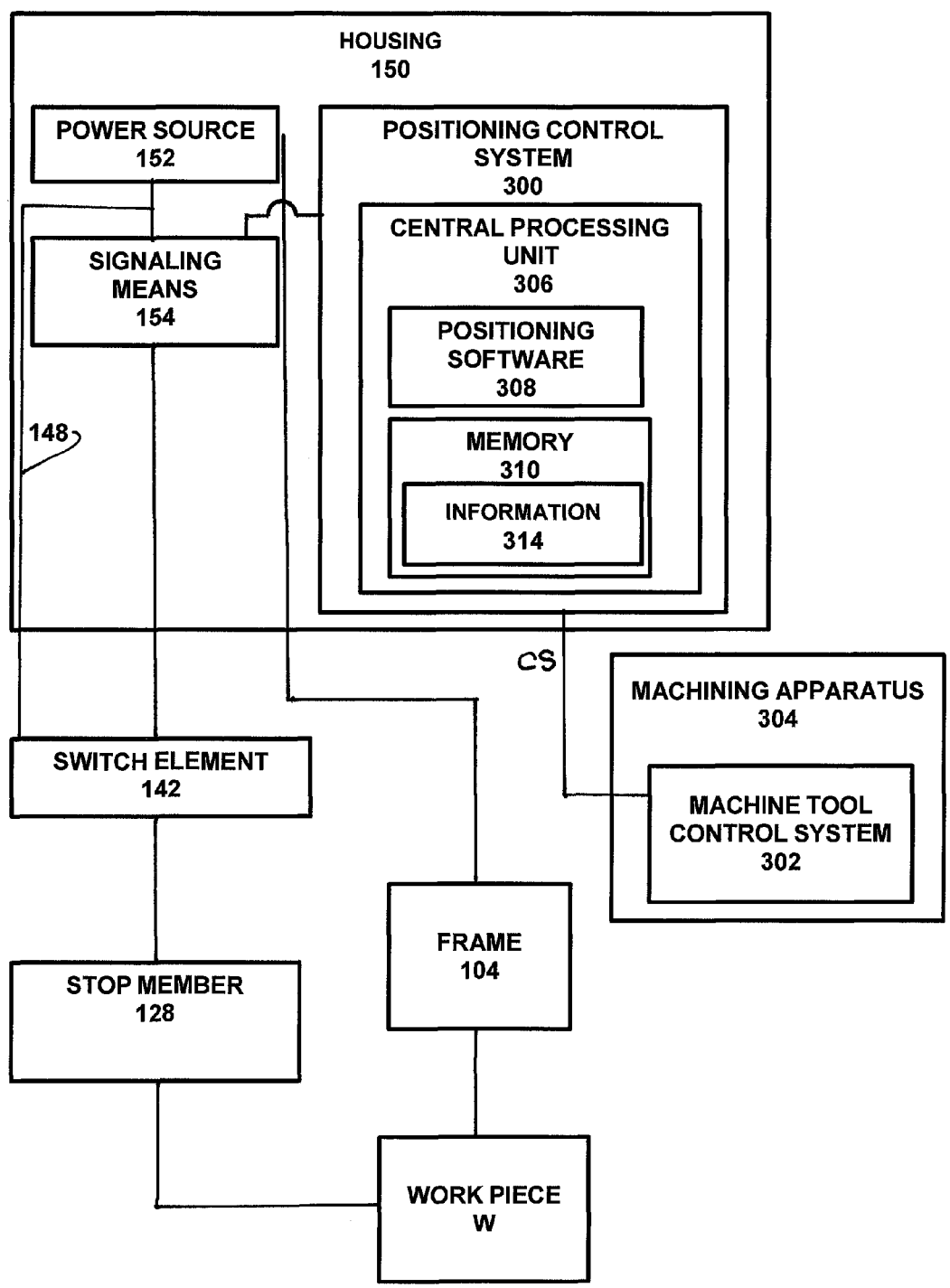
FIG. 4 is an electrical schematic illustration of the positioning work stop of FIG. 1.

In a preferred embodiment of the invention, as shown in FIGS. 1 and 2, a preferred embodiment of the positioning work stop 100 is shown comprising a positioning fixture 102 having an electrically conducting frame 104 and a first shaft 106 with a flat section 108 and a mount 110 attached to the first shaft 106 by a bolt 112 which cooperate together for effectively mounting the positioning fixture 102 to a conventional securing mechanism (not shown) on the machining apparatus 304 (FIG. 4). A second shaft 114 having a vertically extending slot 116 cooperates with the first shaft 106 and a washer and screw 118 that operate to adjustably mount and secure together second shaft 114 and first shaft 106 such that said second shaft 114 is relatively perpendicular to the first shaft 106. As shown, one end of the second shaft 114 is provided with an aperture 120 having a slot 122 extending from the aperture 120 outwardly there from to form first and second cantilever sections 124 and 126, respectfully. An elongated stop member 128 is adjustably mounted to the second shaft 114 through the aperture 120 and secured in place by a screw 132 extending through apertures 134 and 136 in first and second cantilever sections 124 and 126, respectfully, which operates to reduce the diameter of aperture 120 and tighten and secure stop member 128 in place with respect to the second shaft 114. Preferably, aperture 120 is provided with a concentric insulator 138 that operates to electrically insulate stop member 128 from second shaft 114 and includes an aperture 140 for receiving a switch element 142. Referring to FIG. 3, switch element 142 includes an electrically conductive contact 144 that is biased outwardly by biasing member 146, such as an electrically conductive spring provided between conductive contact 144 and a conductive conduit 148 formed from an electric conducting material which is insulted from the frame 104 of the positioning fixture 102 and preferably protected by a shield 160. As shown in FIGS. 1, 2 and 4, mounted to second shaft 114 is a housing 150 having a power source 152, such as a conventional power supply, a 120V electric plug, rechargeable or non-rechargeable battery pack, or other suitable means, and a signaling means 154 which is electrically coupled to the switch element 142 by the conductive conduit 148. As shown, signaling means 154 is electrically connected to one terminal of the power source 152 and the second terminal is electrically connected to the frame 104 of the positioning fixture 102. As shown in FIG. 4, the signaling means 154 is also in electrical communication with the positioning control system 300, such as by means of wire or by a wireless system.

Referring to FIG. 4, a preferred embodiment of the positioning work stop 100 is shown comprising a positioning control system 300 having a central processing unit or processor 306 used to implement the positioning software 308. The positioning control system 300 further includes a memory 310 and may be coupled to other devices, such as a suitable convention input device (not shown), like a keypad, touch screen, or any other suitable input device that can accept information, and one or more suitable output devices (not shown), such as a computer or electronic display device, printer, projection device, and the like. It should be understood that the positioning control system 300 could include any combination of the above components, or any number of different components, peripherals, and other devices. Preferably, the positioning control system 300 operates under the control of an operating system, such as the WINDOWS™ operating system developed by Microsoft Corporation or the Macintosh™ operating system developed by Apple Computer Corporation or other "mainframe" operating system. It should be understood, however, that other operating systems could be utilized to implement the positioning software 308 of the system 100 of the present invention.

Preferably, the processor 306 operates the positioning software 308 and the memory 310 that stores the positioning software 308 or other processing information 312. The positioning software 308 is a computer-readable medium having computer-readable instructions for performing the method of communicating with the machine tool control system 302 of the machining apparatus 304 and performing the method as will be described below. Preferably, the positioning software 308 is an interactive, menu and event driven system that uses prompt, dialog, and entry windows to guide a user to enter information. As used herein, the term "software" refers to any form of programmed machine-readable language or instructions (e.g., object code) that, when loaded or otherwise installed, provides operating instructions to a machine capable of reading those instructions, such as a processor or computer. The positioning software 308 of the present invention can be stored or reside on, as well as be loaded or installed from, various conventional software input devices (not shown) such as one or more floppy disks, CD ROM disks, hard disks or any other form of suitable non-volatile electronic storage media. The positioning software 308 can also be installed by downloading or other form of remote transmission, such as by using Local or Wide Area Network (LAN or WAN)-based, Internet-based, web-based or other remote downloading or transmission methods. Upon a user's entry of appropriate initialization commands entered via an input device, the positioning software 308 is read by the processor 306 and performs the method of the present invention. It should be understood that the positioning software 308 can be written to interact with various configurations of the software used by the machine tool control system 302 of the machining apparatus 304. Further, it should be understood that the positioning software 308 can be stored in a separate positioning control system or can be incorporated into the machine tool control system 302 of the machining apparatus 304.

In a preferred embodiment, the positioning work stop operates such that a machine operator sets the stop member 128 in its proper position for placing the work piece W by sliding the stop member 128 longitudinally through aperture 120 and then secures it in place by tightening screw 132. In place within aperture 120, stop member 128 operates to urge electrically conductive contact 144 of switch element 142 inwardly thereby electrically coupling the stop member 128 to the power source 152 and the signaling means 154 through conductive conduit 148. When an electrically conductive work piece W is placed into its proper position and contacts stop member 128, it completes the electrical connection with the power source 152 and the signaling means 154, as shown in FIG. 4, thereby providing electric power to energize the signaling means 154 and to send a signal to the positioning control system 300. Preferably, the signaling means 154 provides a signal to the operator and electrically communicates with positioning control system 300, by transmitting a signal, that the work piece W is in its proper position for processing. The positioning control system 300 is coupled with and is in communication with the machine tool control system 302 of the machining apparatus 304 such that the positioning control system 300 directs a signal to CS to the machine tool control system 302 directing that the machining operation can begin. For an illustrative example, the positioning control system 300 can be coupled to a power system providing power to the machining apparatus 304 such that when the work piece is in the proper position for processing power is supplied or power is cut when the work piece is not in position for processing. It should be understood that other methods could be used to control the manufacturing operation or the positioning control system could be incorporated into the machine tool control system. In a preferred embodiment, if the work piece W shifts out of its proper position during the manufacturing process, the signaling means 154 operates to transmit a signal to the positioning control system 300 that the work piece W is no longer in position for processing. Upon receiving the signal, the positional control system 300 operates with the machine tool control system 302 to stop the machining process until the work piece W is placed back into its proper position for machining. In another preferred embodiment of the invention, when the signaling means 154 provides a signal to the positioning control system 300 that the work piece W has shifted out of position, the positioning control system 300 operates to record or display information 314 (such as in memory 310) concerning the manufacturing process being performed on the work piece W. Preferably, the information 314 includes the identification of the particular work piece, the time (manufacturing time) the work piece moved out of position during the manufacturing process, and information concerning the manufacturing process, such as the cutting or process location, being performed on the work piece. It should now be apparent to one skilled in the art that the positioning control system and the machine tool control system of the machining apparatus can operate such that the machining operation cannot begin until a signal is received that the work piece is in its proper position for machining and/or stops the machining operation when a signal is received that the work piece has shifted or moved out of its proper position.

Figure 5:
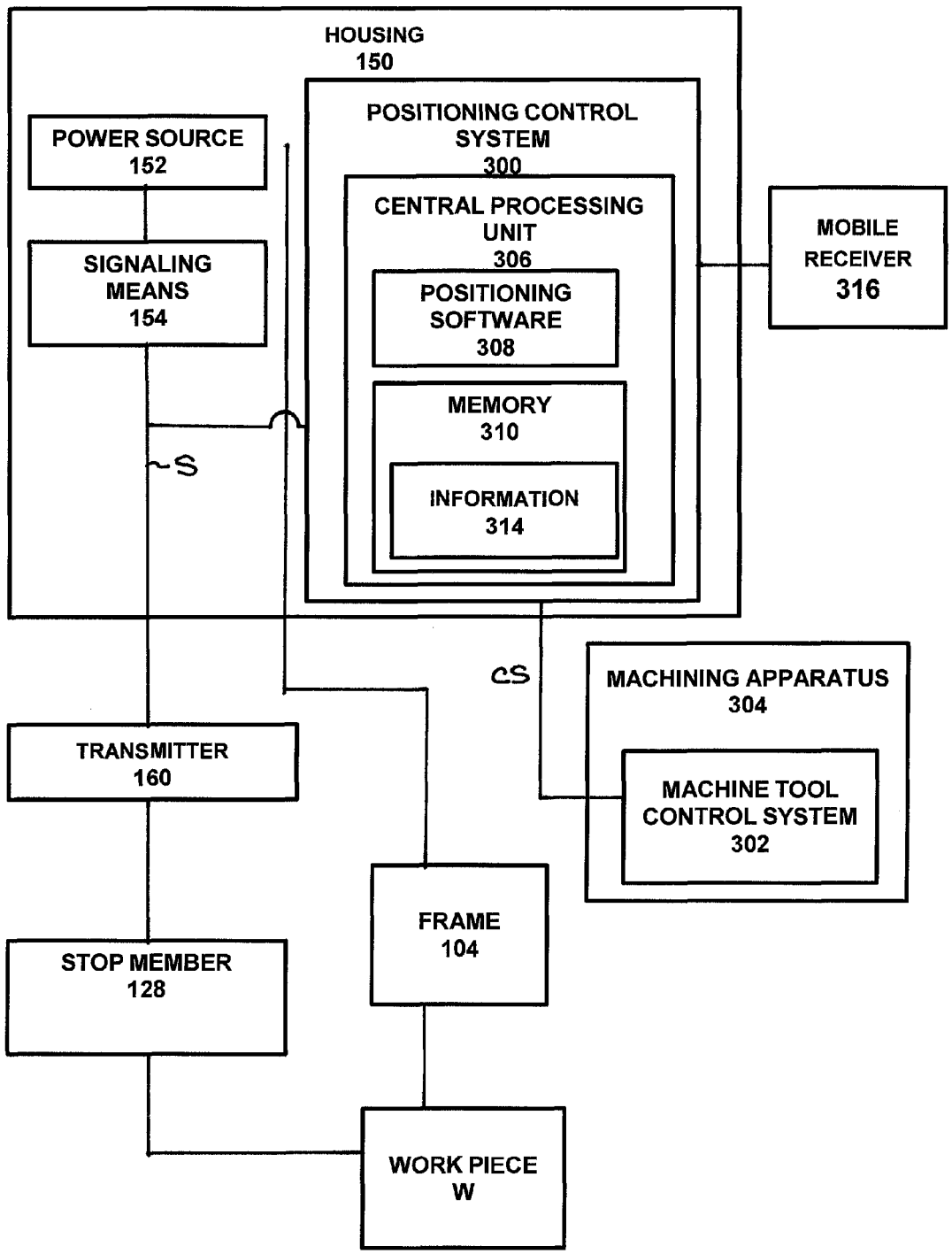
FIG. 5 is an electrical schematic illustration of the positioning work stop of FIG. 1 having a transmitter that operates to transmit a signal to the positioning control system.

Referring to FIG. 5, another preferred embodiment of the invention is shown whereby the power source 152 is electrically coupled to a wireless transmitter 160, through stop member 128, and to the frame 104 such that when the work piece W contacts stop member 128, transmitter 160 is electrically energized and wirelessly transmits a signal to the signaling means 154 which operates to inform the machine operator that the work piece W is in contact with the stop member 128. If during the manufacturing process, if the work piece shifts or moves out of position, the transmitter 160 stops transmitting the signal S to the signaling means 154 which operates to cancel the signal or provides another signal to inform the machine operator that the position is no longer in its proper position. It should also be understood that in another preferred embodiment, the wireless transmitter 160 operates to provide a signal S to the positioning control system 300 which communicates with machine tool control system 302, as described above, not to begin the manufacturing process or to stop the manufacturing process until the work piece W is back into the proper position for manufacturing. It should be understood, that the use of a wireless transmitter allows signals to be sent to various locations, including locations in remote areas of a building or to other rooms without the need for wiring thereby significantly reducing cost. Further, operators and use mobile receivers 316, such as attached to their belts, allowing the operator freedom to travel while monitoring the positioning of the work piece. It should also be understood that the positioning control system can also include a wireless transmitter for communicating with an operator's mobile receiver.

It should be understood that in a preferred embodiment of the position work stop of the present invention, a signaling means 154 is electrically coupled to the stop member 128 such that when the work piece W makes contact with the stop member 128 the signaling means 154 is energized by the power source 152 and provides a signal, such as a visible or audio signal, to alert the machine operator that the work piece W is in its proper position for machining. It should also be understood that in another preferred embodiment of the invention, transmitter 160 operates to wirelessly transmit an electrical signal, such as by way of a radio signal, to the positioning control system 300. It should be understood that the transmitter 160 can be connected to power source 152 or have its own power source, or connected to another power source. When the work piece W is placed in its proper position for manufacturing, the positioning control system 300 (or in a preferred embodiment and/or the machine tool control system 302 of the machining apparatus 304) operates to permit the machining operation to begin. In the event that the work piece W shifts out of position during the machining process, the electrical signal S is terminated or a new signal transmitted that when received by the positioning control system 300 (or in a preferred embodiment and/or the machine tool control system 302 of the machining apparatus 304) operates to prevent and/or stop the machining operation.

Figure 6:
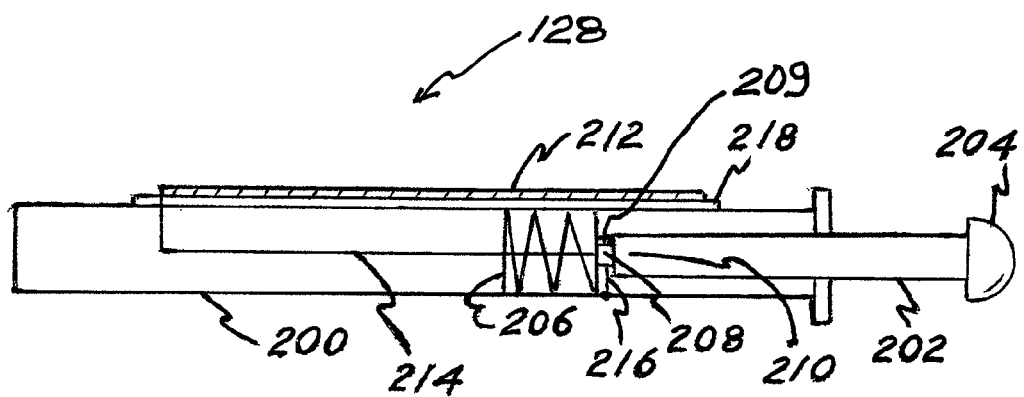
FIG. 6 is another preferred embodiment of the positioning work stop of the present invention showing the stop member in the form of a conventional absolute position transducer having a housing and an elongated core for activating a switch when the work piece is in its proper position for machining.
Figure 7:
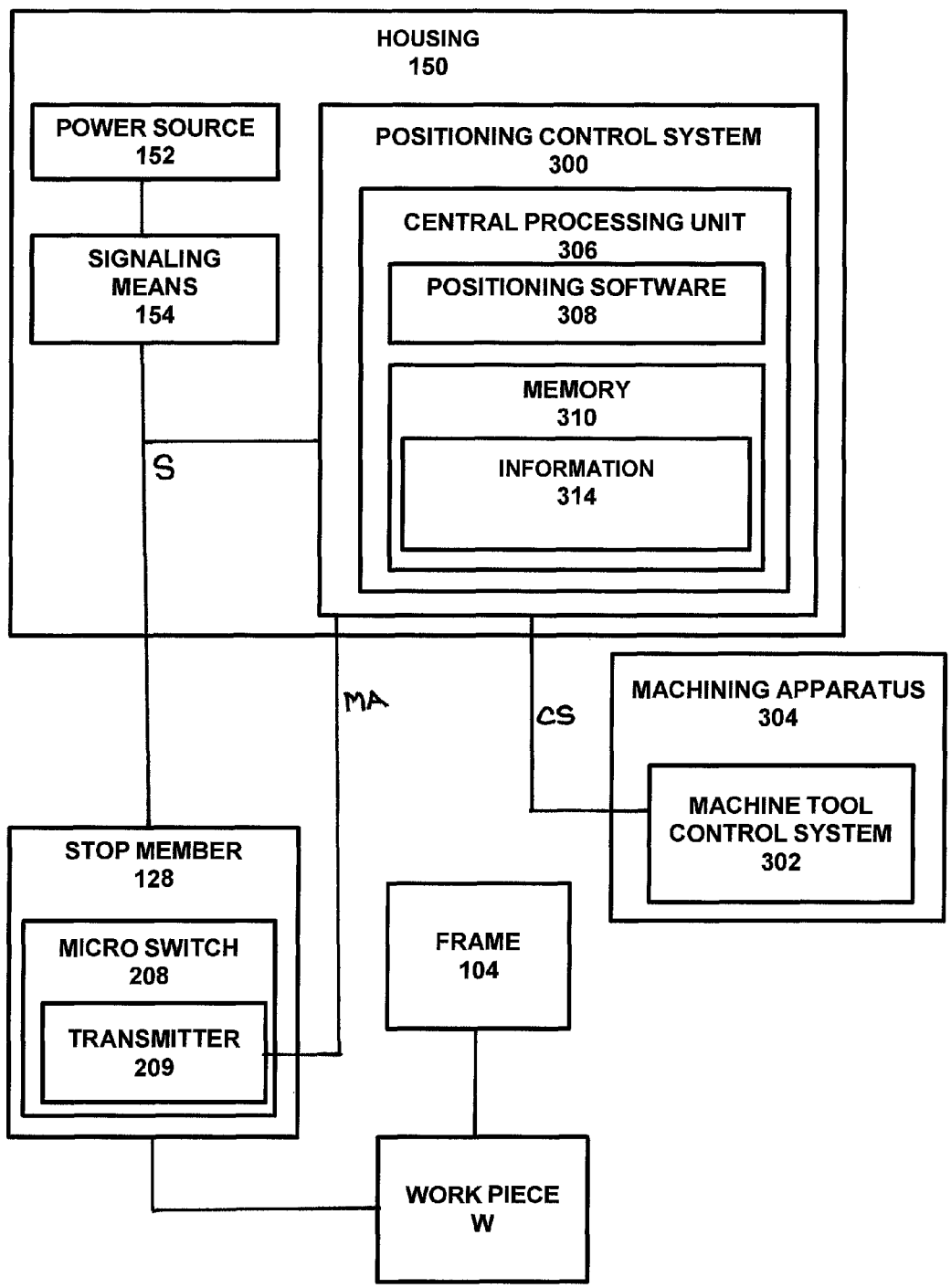
FIG. 7 is an electrical schematic illustration of the positioning work stop of FIG. 6.

In another preferred embodiment of the invention, as shown in FIGS. 6 and 7, the stop member 128 is in the form of an absolute position transducer, such as an inductive transducer or other such transducer, effective for measuring small changes in the position of the work piece W, or other form of stop member 128 operable for determining if the work piece W is in proper position for a manufacturing operation to be performed thereon and the amount of any changes in the work piece's position. As shown, the stop member 128 is a conventional absolute position transducer having an elongated movable core 202 disposed and slidably secured within the fixed elongated housing 200 and includes a rounded contact surface 204 extending outwardly from the elongated housing 200. The elongated core 202 is biased outwardly from the housing 200 by a biasing member 206, such as a spring or another equivalent structure (such as for an example a block of compressible elastomeric material or molded plastic spring element). The stop member 128 is electrically coupled to the power source 152 by a conductive conduit 218 such as a wire and may include an insulation covering 212.

In operation, the machine operator sets the stop member 128, in the form of an absolute position transducer, in its proper position for placing the work piece W by sliding the housing 200 longitudinally through aperture 120 and then secures it in place by tightening screw 132 (FIG. 2). The work piece W is then positioned in its proper position for machining such that it makes contact with the contact surface 204 of the movable core 202 which is pressed inwardly thereby exerting a force on the micro switch 208 that operates to determine the amount of movement of the movable core 202 into or out of the housing 200, such as by use of electrical induction, pressure changes, or other such means and transmits such changes, such as by an electrical connection with the signaling means 154. In operation, the stop member 128 is placed within aperture 120 of frame 114 such that the movable core 202 is in position for contact with the work piece W. Preferably, the stop member 128 and the work piece W are positioned such that the movable core 202 is pushed inward into the housing 202 a predetermined distance until the work piece W is in its proper position for processing. In this way, if the work piece W shifts forward or backward, the movable core 202 will maintain contact with the work piece and the amount of movement of the movable core 202 can be measured and transmitted by transmitter 209 to the signaling means 154 that functions to alert the operator and to the positioning control system 300 that preferably operates to record the manufacturing information 314, and/or the machine tool control system 302 of the machining apparatus 304.

Preferably, the transmitter 209, is a wireless transmitter and more preferably a micro transmitter, electrically coupled to the power source 152 such as through electrical conduit 218, such as a wire. It should be understood that the transmitter 209 can include its own power source or be connected to another power source. It should also now be apparent to one skilled in the art that the use of a stop member 128 in the form of a position transducer, as described above, permits accurate measurement of the position and/or the amount of movement of a work piece from its initial position for manufacturing. In operation, the work piece W makes contact with the elongated core 202 which is pushed inwardly a predetermined amount into the elongated housing 200 until the work piece W is in its proper position for machining. The transmitter 209 operates to transmit a signal S to the operator and/or the positioning control system 300 indicating that the work piece W is in its proper position for manufacturing. During the manufacturing operation, if the work piece W shifts or moves such that the elongated core 202 is pushed inward by the shifting work piece W into the housing 200 or is allowed to move outward by the biasing member 206 out the housing 200, the transmitter 209 operates to transmit a signal S to the operator that the work piece W is no longer in its proper position for processing and/or operates to transmit a signal S to the positioning control system 300 (or in a preferred embodiment, and/or to the machine tool control system 302 of the manufacturing apparatus 304) that the work piece has shifted or moved out of its proper position. The positioning control system 300 (or in a preferred embodiment, and/or the machine tool control system 302) as described above, thereby operates to notify the operator and/or postpone the start of the manufacturing operation until the work piece is in its proper position and/or operates to stop the manufacturing operation until the work piece is placed back into its proper position for manufacturing.

In another preferred embodiment of the invention, the stop member 128 is in the form of an absolute position transducer that operates to measure the amount (distance) that the work piece has shifted or moved out of position and transmits the measured amount (distance) MA that the work piece moved to the positioning control system 300 (or in a preferred embodiment, and/or to the machine tool control system 302 of the machining apparatus 304). The positioning software 308 of the positioning control system 300 and determines if the movement of the work piece is within a predetermined tolerance to permit the machining process to continue and/or cooperates with the machine tool control system 302 to adjust the manufacturing process to compensate for the movement of the work piece. It should now be apparent to one skilled in the art that by monitoring the work piece and detecting and measuring the movement of the work piece during the manufacturing process, as disclosed herein, helps to ensure that the work piece is manufactured to specifications thereby reducing scrap and the cost of manufacturing. Further, by automatically adjusting the manufacturing process to compensate for movement of the work piece reduces manufacturing time while reducing scrap and manufacturing costs. It should also now be apparent that the stop member, being a position transducer, and as described herein allows the positioning tool to be used on work pieces that are made of electrically conductive material or nonconductive material. It should also now be apparent that the use of a transmitter reduces the need for wire connections and increases the speed of set-up thereby reducing the cost of manufacturing.

It should be understood that in the preferred embodiment of the invention, the positioning work stop of the subject invention is not limited to the positioning fixture described herein but can comprise other similar conventional positioning fixtures and is operational with use with any work piece that is formed from electrically conductive material. It should also be understood that a preferred embodiment, the positioning work stop of the subject invention provides a means for allowing the machine operator to know when the work piece is in its proper position for machine and will also allow the machine operator to know if the work piece is no longer in its proper position for machining. Further, in a preferred embodiment of the invention, when the work piece moves out of position, the positioning work stop provides a signal to the positioning control system which cooperates with the machine tool control system of the machining apparatus to stop the machining or cutting process until the work piece is repositioned back into position. It should now be apparent to one skilled in the art that by immediately stopping the machining operation when the work piece moves out of position will significantly reduce the risk of manufacturing errors and the amount of scrap being generated. Further, by recording or displaying cutting information at the time the work piece has shifted out of its proper position allows an operator to review the work piece to determine if reprocessing or scrapping of the work piece is necessary.

As described and shown herein, the positioning work stop for use with a machine tool offers significant advantages over other positioning work stops. The signaling means operates as a placement indicator that is effective for providing a signal if the work piece to be machined is in its proper position for machining or for signaling if the work piece has shifted out of position for machining. This significantly reduces the labor associated with ensuring the proper placement of the work piece and ensuring that the work piece has not shifted out of proper placement prior to and during the machining operation. Further, the positioning work stop of the subject invention operates to prevent the start of the manufacturing process if the work piece is not in its proper position or stops the manufacturing process in the event the work piece shifts out of position during the machining process. In a preferred embodiment of the invention, the positioning work stop operates to measure the amount that the work piece has shifted out of position and transmits the measurement to the control system of the machining apparatus thereby allowing the control system to operate and determine if the work piece remains within the process tolerance or operates to adjust the manufacturing operation to compensate for the shift in the position of the work piece. In addition, the embodiments described herein provides a positioning work stop that does not require any exposed wires, is relatively inexpensive to manufacture, and is simple and easily installed on a conventional positioning fixture.

I claim:

1. A positioning work stop for use with a machining apparatus having a machine tool control system for controlling the manufacturing process on a work piece, the positioning work stop comprising:
    a stop member for contacting the work piece when the work piece is in proper position for the machining process;
    a signaling means in electrical communication with said stop member and operates to indicate when the work piece is in contact with said stop member or has moved out of position and is no longer in contact with said stop member;
    a positioning control system in communication with said signaling means and the machine tool control system; and
    wherein said positioning control system cooperates with the machine tool control system such that the manufacturing process will not begin until the work piece is in proper position for receiving the manufacturing process and is in contact with said stop member and will stop the manufacturing process when the work piece is no longer in the proper position for receiving the manufacturing process and no longer in contact with said stop member.

2. The positioning work stop of claim 1, wherein said signaling means comprises a light source for providing a visual signal.

3. The positioning work stop of claim 1, wherein said signaling means comprises an audio source for providing an audio signal.

4. The positioning work stop of claim 1, wherein said stop member is removably attached to a positioning fixture.

5. The positioning work stop of claim 1, wherein said stop member is electrically coupled to said signaling means and to a power supply through a positioning fixture.

6. The positioning work stop of claim 1, wherein said stop member is a position transducer.

7. The positioning work stop of claim 1, wherein said stop member operates to measure the distance that the work piece has moved out of position during the manufacturing process.

8. The positioning work stop of claim 7, wherein said positioning control system operates to determine if the work piece is still in position to allow the manufacturing process to continue and produce a work piece that meets a manufacturing specification.

9. The positioning work stop of claim 7, wherein said positioning control system cooperates with the machine tool control system to recalibrate the machining apparatus to compensate for the distance the work piece has moved out of position during the manufacturing process.

10. The positioning work stop of claim 5 wherein said power supply is a rechargeable power supply.

11. The positioning work stop of claim 1, further comprising a transmitter for wirelessly transmitting a signal to a mobile receiver.

12. The positioning work stop of claim 1, wherein said positioning control system records manufacturing information.

13. A positioning work stop for use with a machining apparatus having a machine tool control system for controlling the manufacturing process of a work piece, the positioning work stop comprising:
- a stop member in the form of an absolute position transducer that operates to send a signal when the work piece makes contact with said stop member showing the work piece is in proper position for receiving the manufacturing process;
- a signaling means in electrical communication with said stop member;
- a positioning control system in communication with the machine tool control system;
- wherein when said stop member operates to determine if the work piece has moved out of contact with said stop member and the amount that the work piece has moved;
- wherein said signaling means operates to provide a signal when the work piece is no longer in contact with said stop member; and
- wherein said positioning control system is in communication with said signaling means and cooperates with the machine tool control system to permit the machining apparatus to begin the manufacturing process when the work piece is in contact with said stop member and to stop the manufacturing process on the occurrence of the work piece is no longer being in contact with said stop member.

14. The positioning work stop of claim 13, wherein said positioning control system operates to determine if the work piece has moved out of a predetermined tolerance.

15. The positioning work stop of claim 13, wherein said positioning control system cooperates with the machine tool control system to adjust the manufacturing process to compensate for any movement of the work piece.

16. The positioning work stop of claim 13, further comprising a transmitter for wirelessly transmitting a signal to a mobile receiver.

* * * * *